United States Patent [19]

Schwartz

[11] Patent Number: 5,950,191

[45] Date of Patent: *Sep. 7, 1999

[54] METHOD AND SYSTEM FOR ACCESSING AN ITEM IN A LINKED LIST USING AN AUXILIARY ARRAY

[75] Inventor: Andrew Schwartz, Foster City, Calif.

[73] Assignee: Oracle Corporation, Redwood Shores, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/861,131

[22] Filed: May 21, 1997

[51] Int. Cl.⁶ .......................................... G06F 17/30
[52] U.S. Cl. .......................... 707/3; 707/1; 707/2
[58] Field of Search .................... 1/1; 395/671; 707/533, 707/3, 2, 1; 379/207; 340/825; 341/51, 106, 67; 711/171

[56] References Cited

U.S. PATENT DOCUMENTS

| | | | |
|---|---|---|---|
| 5,016,009 | 5/1991 | Whiting | 341/67 |
| 5,126,739 | 6/1992 | Whiting | 341/106 |
| 5,146,221 | 9/1992 | Whiting | 341/67 |
| 5,414,425 | 5/1995 | Whiting | 341/67 |
| 5,463,390 | 10/1995 | Whiting | 341/51 |
| 5,506,580 | 4/1996 | Whiting | 341/51 |
| 5,532,694 | 7/1996 | Mayers | 341/67 |

*Primary Examiner*—Thomas G. Black
*Assistant Examiner*—Diane D. Mizrahi
*Attorney, Agent, or Firm*—Wagner, Murabito & Hao

[57] ABSTRACT

A linked list of items in a sorted order is created and stored in memory. In addition to the linked list of items, an auxiliary array is also created and stored in memory. The auxiliary array contains pointers to a subset of items from the linked list. When a request is received to locate a particular item in the linked list, a binary search is first performed on the pointers stored in the auxiliary array. The result of this search provides a pointer for accessing an entry-point item on the linked list. The entry-point item is either the particular item or is an item that precedes the particular item in the linked list. The linked list is then traversed from the entry-point item rather than from a starting pointer (i.e., head) until the particular item is accessed.

30 Claims, 7 Drawing Sheets

METHOD AND SYSTEM FOR ACCESSING AN ITEM IN A LINKED LIST USING AN AUXILIARY ARRAY

FIELD OF INVENTION

The present invention relates generally to linked lists, and more particularly to accessing a linked list by using an auxiliary array.

BACKGROUND ART

With the advent of Information Age, information has become the currency of exchange for the computers which permeate every facet of people's lives. Each day, computers process masses of information in fields such as business, education, finance, government, and industries. Constantly, information is amassed and processed to supplant or modify an existing information base.

Before information can be processed however, it is usually transformed into a structured data format which is then stored, accessed and edited on a computer. For example, a mail order business accumulates information about its customers. In order to automate its business to use computers, the customer information is transformed into a computer readable structured data format containing the name, address, phone numbers, and other elements. Once the data is stored in this format, the mail order business can utilize computers to maintain and update its customer database.

Usually, a set of data items is stored in a computer storage unit as a sorted list in some specified order (e.g., chronological, hierarchical, ascending, descending, alphabetical, numerical, etc.). This is because a sorted list allows for more systematic access and maintenance. For example, in a mail order business, the linked list of customer database may be sequentially sorted in alphabetical order of the customer names. This allows for easier access and updating of customer data items in the list.

Typically, a set of data items are stored in one of two ways: a single dimensional array or a linked list. A linked list is essentially a sequential list of data items connected in series by pointers. Each pointer is associated with a data item and references a memory cell containing the next data item. It may hold the computer's representation of the next data item's memory cell location or an address of the cell in memory. All data items in a linked list are connected in sequence from the first item to the last by pointers. The pointer to the first item is usually stored in a specially provided head node pointer that points to the first data item. The pointer for the last item is not defined until another item is added after it. At that time, its pointer is assigned a value of the cell location of the newly added item.

Updating and maintaining linked lists is relatively simple and straightforward. An item in a linked list may be added or deleted merely by updating a couple of pointers on either side of the item to be added or deleted. In addition, linked lists do not require memory re-allocation to accommodate additions or reductions in items.

Unfortunately, the sequential nature of a linked list allows only sequential access to its individual data items; it does not have the flexibility of random access to items. To access a particular item, each item on the list prior to the desired item must be traversed, comparing each item along the way until the desired item is found. For example, in order to access an Nth data item in a linked list, each item in the linked list must be traversed from the first node to the Nth node. The linear traversal through the nodes in a linked list may be prohibitively slow for very large lists. Because the access time depends on the size of the list, linear traversal method does not scale well. This performance problem is exacerbated in interpretive environments. Furthermore, the computation time associated with traversing long lists can be quite expensive.

A single dimensional array provides an alternative way of storing a set of data items in a sorted list. A single dimensional array stores a sorted list of items by allocating a fixed block of memory for the array. The block of memory is segmented to allow segmented addressing. In other words, an address of an item in the array is computed based on an index of the relative distance between the items in the array. According to the segmented addressing scheme, the first item in an array is assigned the base address of the array. The addresses of remaining items in the array are assigned an offset (i.e., index) from the base address. To access a specific item in the array, an offset is added to the base address of the array to determine the address for the item. Hence, if an index of an item is known, the array allows random access to the item.

Even if an index of an item is not known in advance, access to an item in a sorted array can be efficiently implemented by using a binary search method. For example, for an array containing N items, the total search steps required for locating an item are $\log_2 N$ in the worst case. If an array contained 10,000 items, a binary search would take $\log_2(10,000)$, or 14 steps at most to find an item in the array.

Unfortunately, adding or deleting items from an array is highly inefficient and slow. In particular, adding or removing an item in the middle of an array requires that all of the items after the insertion/deletion point be shifted. Moreover, an addition may require that the array be re-allocated to make room for more items using array growing algorithms. If too much space is allocated for the array, precious memory space is wasted. On the other hand, if the array expansion algorithm is too conservative, this may result in frequent and potentially expensive re-allocations. Thus, arrays have been difficult to update through additions and deletions of items.

The arrays and linked lists have thus presented designers with a dilemma of choosing between access speed versus ease of updating. Thus, what is needed is a method and system for providing access to data items which is both fast, and easily maintained and updated. The present invention provides a hybrid solution which advantageously exploits the best features of arrays and linked lists to provide superior access speed and ease of updating.

SUMMARY OF THE INVENTION

A linked list of items in a sorted order is created and stored in memory. In addition to the linked list of items, an auxiliary array is also created and stored in memory. The auxiliary array contains pointers to a selected subset of items from the linked list. When a request is received to locate a particular item in the linked list, a binary search is first performed on the pointers stored in the auxiliary array. The result of this search provides a pointer for accessing an entry-point item on the linked list. The entry-point item is either the particular item or is an item that precedes the particular item in the linked list. The linked list is then traversed from the entry-point item rather than from a starting pointer (i.e., head) until the particular item is accessed. By first performing a binary search; the present invention can quickly determine a range in which the desired item falls within the linked list. Furthermore, the memory and updating overhead associated with the auxiliary array is kept nominal by selecting an appropriate number of items to be stored in the array.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

In the following detailed description of the present invention, a method and system for providing fast access to an item in a linked list, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing, and other symbolic representations of operations on data bits within a computer or digital system memory. These description and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels to be interpreted further in view of terms commonly used in the art. Unless specifically stated otherwise as apparent from the following discussions, it is understood that throughout discussions of the present invention, discussions utilizing terms such as "processing" or "computing" or "generating" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

Computer System

Figure 1:
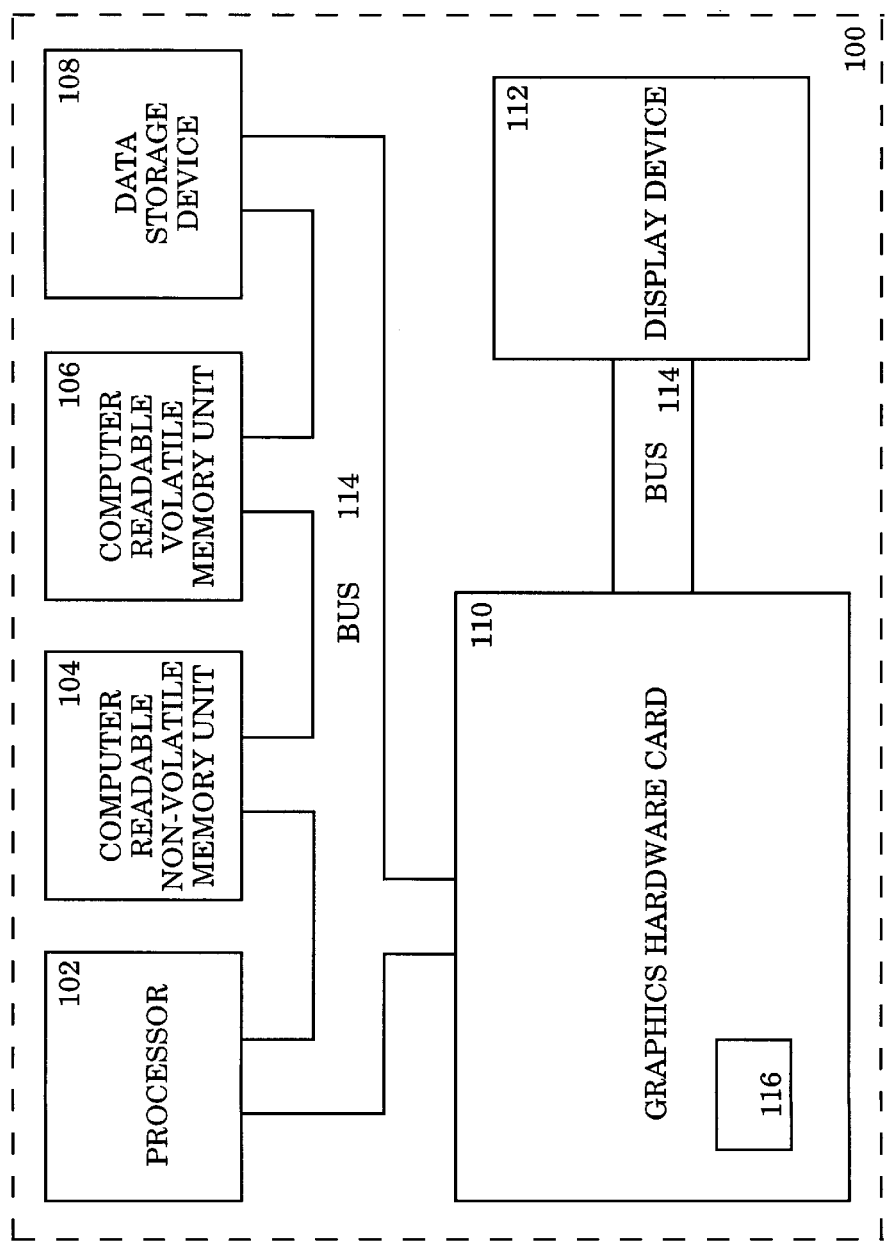
FIG. 1 illustrates a block diagram of an exemplary computer system that can be used in accordance with the present invention.

With reference to FIG. 1, a block diagram is shown of a computer system 100 used in accordance with the present invention. In general, computer system 100 used by an embodiment of the present invention comprises an address/data bus 114 for communicating information, one or more host processors 102 coupled with bus 114 for processing information and instructions, a computer readable volatile memory unit 106 (e.g., random access memory unit) coupled with bus 100 for storing information and instructions (e.g., graphics data) for the host processor 102, a computer readable non-volatile memory unit 104 (e.g., read only memory unit) coupled with bus 114 for storing static information and instructions for the host processor 102, a computer readable data storage device 108 such as a magnetic or optical disk and disk drive (e.g., hard drive or floppy diskette) coupled with bus 114 for storing information and instructions, and a display device 112 coupled to bus 114 for displaying information (e.g., 3D images) to the computer user. The display device 112 utilized with the computer system 100 of the present invention can be a liquid crystal device, cathode ray tube, or other display device suitable for creating graphic images and alphanumeric characters recognizable to the user.

The present invention provides a method and system for providing fast access to items stored in a sorted linked list using an auxiliary array as an index. The method and system of the present invention utilize a hybrid combination of a linked list and a single dimensional array. Hence, the present invention advantageously exploits the best features of arrays and linked lists to provide superior access speed and ease of updating.

Figure 2:
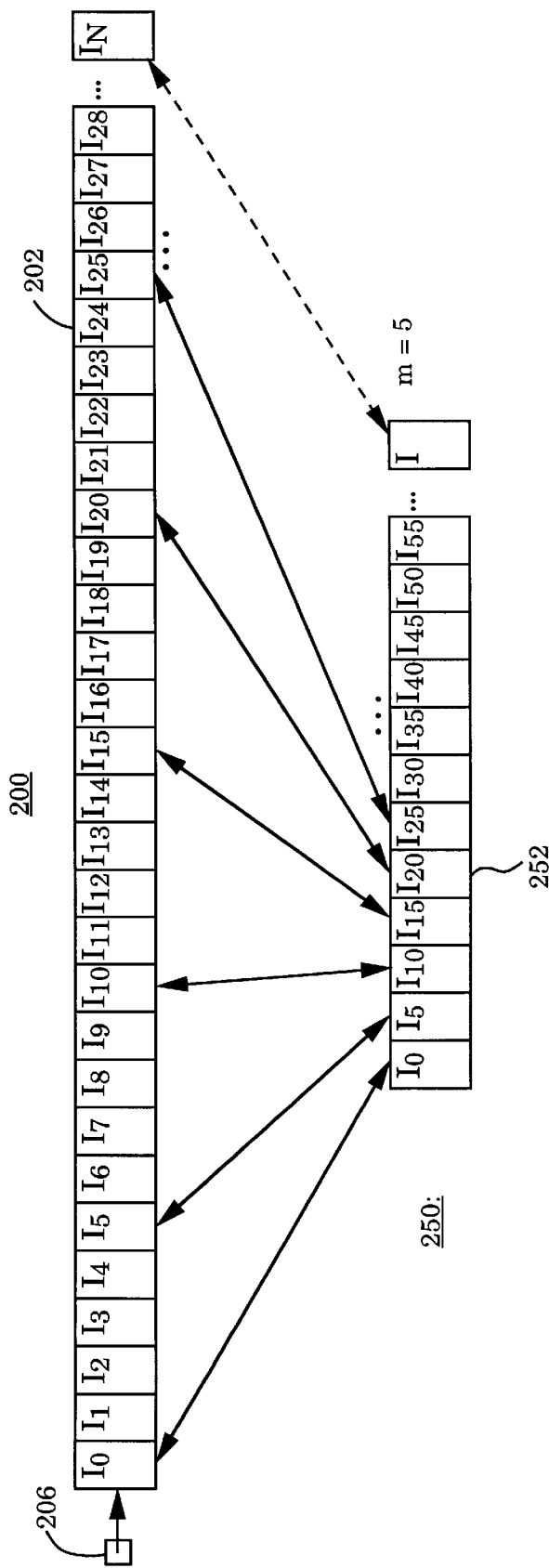
FIG. 2 provides an overview of the present invention by illustrating an exemplary linked list and its corresponding auxiliary array.

FIG. 2 provides an overview of the present invention by illustrating an exemplary linked list 200 and its corresponding auxiliary array 250. The present invention utilizes the exemplary linked list 200 containing N items, $I_0$ through $I_N$. Each item has a data field and a pointer field. The linked list 200 is linearly accessible through a starting pointer 206 (i.e., head). Hence, all of the benefits of a linked list are realized.

In addition, in order to improve access time to an item in the linked list 200, the auxiliary array 250 is generated and stored in memory. The auxiliary array contains pointers to a subset of items, preferably every mth item, on the linked list. In the present embodiment, the exemplary auxiliary array 250 contains a pointer to every fifth item (m=5) on the linked list 200. As shown in FIG. 2, the first item in the auxiliary array contains a pointer pointing to the first item in the linked list. The second item in the auxiliary array contains a pointer pointing to the sixth item on the linked list, and so on. The arrows between the items in the linked list 200 and the auxiliary array 250 show the correspondence between the linked list 602 and the auxiliary array 604.

Based on this correspondence, the auxiliary array 250 of pointers serves as an index to the linked list 200. That is, in order to access a desired item, $I_{24}$ 202 for example, a search on the auxiliary array 250 is performed to get to within at most m items of the desired item. This search yields an access pointer (i.e., index), which is $I_{20}$ 252. Based on this access pointer, item $I_{20}$ 252 is accessed, and from there a linear search across the subsequent items, namely $I_{21}$ through $I_{23}$, is conducted to locate the exact item, $I_{24}$ 252, in the linked list.

Figure 3:
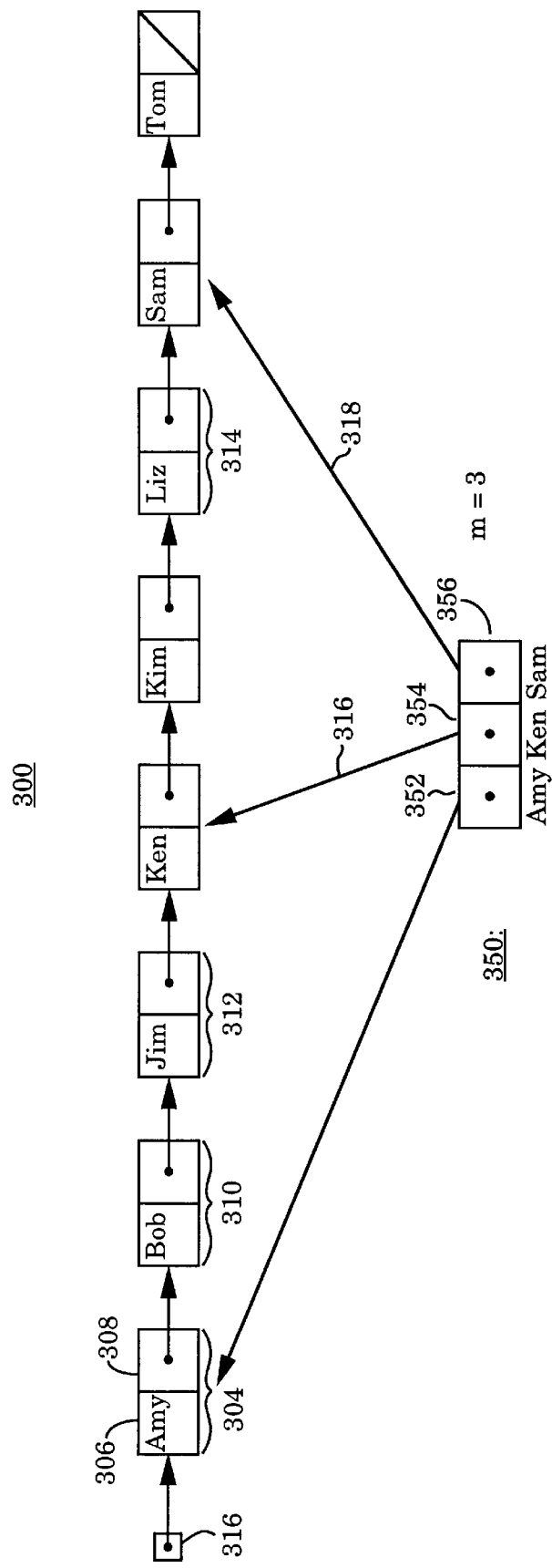
FIG. 3 illustrates an exemplary linked list having a multitude of items sorted in an alphabetical order for implementing embodiments of the present invention.

FIG. 3 illustrates an exemplary linked list 300 having a multitude of items sorted in an alphabetical order for implementing embodiments of the present invention. The linked list 300 is comprised of 8 items. Each item has a data field (i.e., element) for a name and a pointer, which is featured as an arrow originating from a dot. The data field (i.e., name) serves as the key for determining a sorted order in the linked list 300, which is arranged in an alphabetical order. For example, the item 304 contains "Amy" as its data item 306 and a pointer 308, which points to the location of the next item 310. By using the pointers to point to the next item, all items are connected in series as a chain from the first item 304 to the last item 312, which contains an undefined pointer field 314. In addition, a starting pointer 316 (i.e., head) points to the location of the first item 304 and thereby allows access to the linked list 300.

Figure 4:
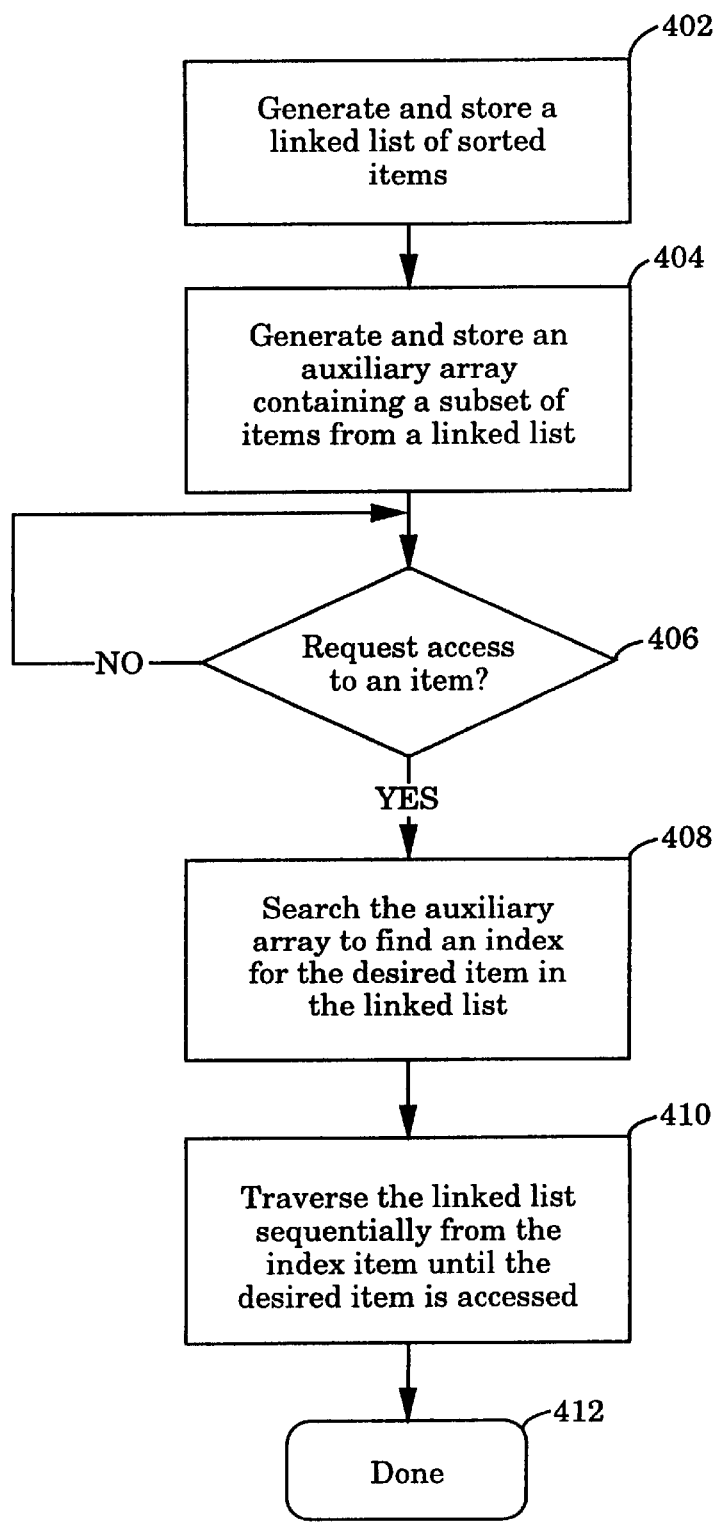
FIG. 4 illustrates a flow diagram of major steps involved in implementing a linked list with an auxiliary array.

FIG. 4 illustrates a flow diagram of major steps involved in implementing an auxiliary array with a sorted linked list. In step 402, the present embodiment generates and stores a linked list containing a multitude of items (i.e., nodes) into a storage unit in a computer system. Each item in the list contains a data element for storing data and a pointer to the next item in the chain of nodes. Then in step 404, the present embodiment generates and stores an auxiliary array into a storage unit in a computer system. The auxiliary array contains pointers to a subset of items from the linked list. Each pointer stored in the auxiliary array, if selected during a search process, serves as an access pointer (i.e., index) which enables access to an entry-point item in the linked list. Hence, the rest of the items in the linked list subsequent to the entry-point item is accessible. In step 406, a request is received to locate a specific item in the linked list. Then in step 408, in order to access the desired item in the linked list, the auxiliary array is searched for an access pointer, which is a pointer to either the desired item or an item close to and preceding the desired item. After an access pointer in the auxiliary array is located, in step 410, the linked list is accessed at the entry-point item using the access pointer and the linked list is thereafter linearly traversed until the desired item is found.

Figure 5:
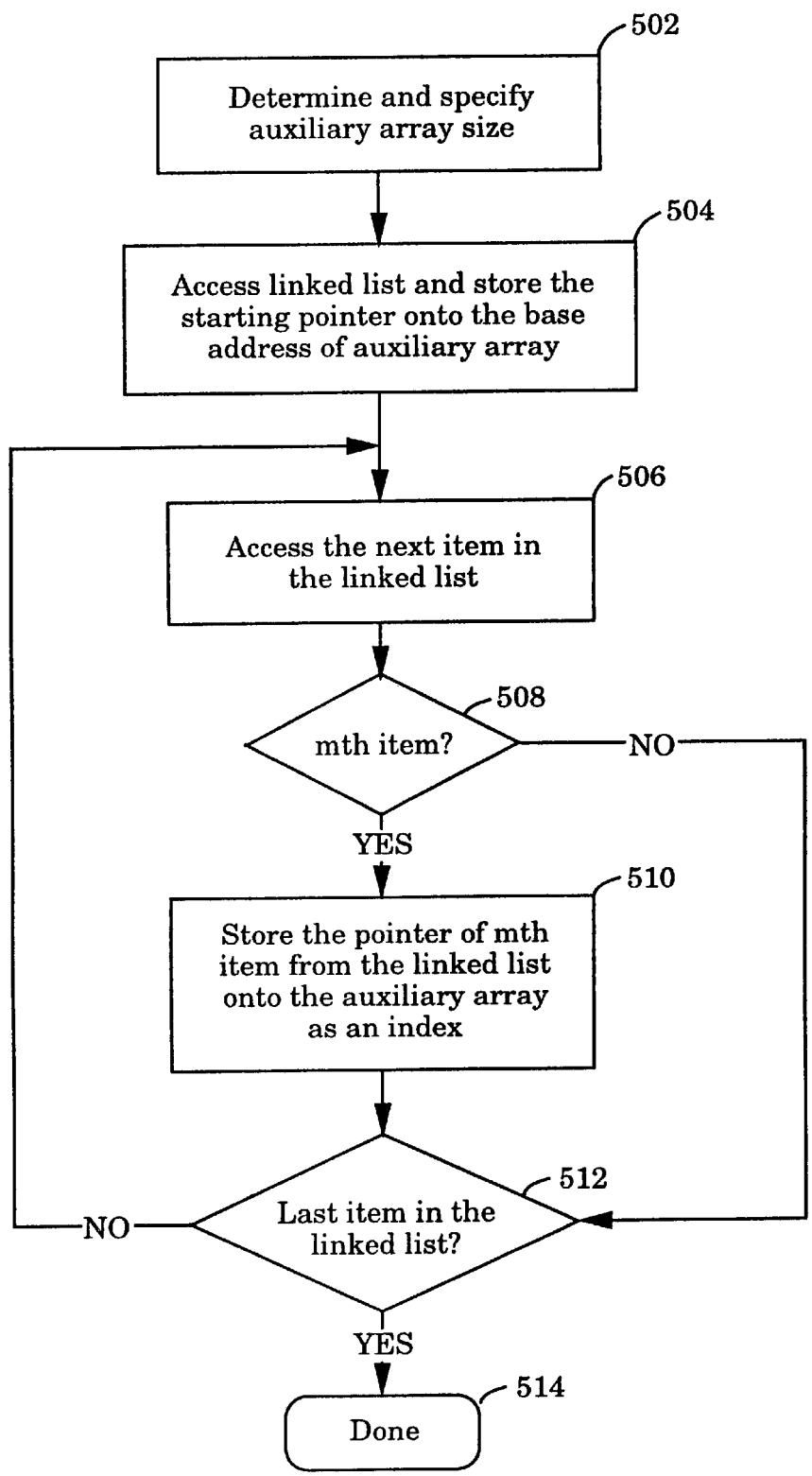
FIG. 5 illustrates a flowchart of exemplary steps taken in generating an auxiliary array from a linked list.

FIG. 5 illustrates a flowchart of exemplary steps taken in generating an auxiliary array from a linked list. In step 502, a size of the auxiliary array (i.e., number of items) to be generated is determined and specified to allocate an amount of memory to store all items. This is because an array, by its nature, is a static data structure. If after an array is created, it turns out to be too small, then a new array size is specified. This process is called "re-allocation of array," which is a well known technique in the art.

In the embodiments of the present invention, the size of the auxiliary array is dependent on two factors: the total number of items in the linked list to be accessed, represented by N, and the interval, in terms of the number of items m, between the items in the list to be sampled. The auxiliary array size and the sampling interval, m, can be set by a user or determined automatically according to a specified formula. In the first case, a user may choose a desired sampling interval, represented by m, and submit it to the computer. The user may also specify the array size. However, the array size cannot be smaller than (N/m)+1. Otherwise, the array will not be able to accommodate all sampled items from the linked list. In practice, it may be desirable to provide an array size that is bigger than (N/m)+1 and that leaves reasonable spaces to accommodate future growth of the list.

After specifying a size for the auxiliary array, in step 504, the present embodiment copies the starting pointer (i.e., head or the address of the first item) and stores it into the base address of the newly allocated array as the first access pointer (i.e., index item). Then using the starting pointer, the present embodiment accesses the next item in the linked list in step 506, which is the first item. That item is tested to determine if it is the mth item (i.e., node) in the linked list in step 508. If it is, then in step 510, a pointer to the item is copied and stored as an access pointer into an address of the array after the previous entry. For example, the starting pointer is stored in the base address of the auxiliary array. The second index item is stored in the next address in the array determined by adding an offset to the base address. In steps 508 and 512, if the item is not to be indexed (i.e., sampled) into the auxiliary array and it is not the last item in the linked list, then the next item in the linked list is accessed based on the pointer provided in the item just accessed. In this manner, the starting pointer and the pointer in every mth item of the linked list is accessed and copied into the array as indexes or access pointers. The address of each new item stored into the auxiliary array is determined by adding a specified offset to the previous item's address. When the last item in the linked list has been accessed and processed, the process terminates in step 512. It should be appreciated that an array addressing through the use of a base address and an offset are well known in the art and are mostly transparent to high level programs.

With reference now to FIG. 3, an exemplary auxiliary array 350 generated from the linked list 300 is shown based on a sampling interval (m) of 3. The starting pointer 316 (i.e., head) of the linked list is copied and stored as the first access pointer 352 in the auxiliary array. This first access pointer 352 points to the first item in the linked list 300. In the present example, the first access pointer 352 points to item 304 (Amy) on the linked list 300.

The auxiliary array then samples, preferably, every mth item in the linked list. Since the linked list 300 has a total number of items (N) of 8, the auxiliary array 350 must have at least the integer number of items of ((N/m)+1) rounded down, which yields three for m of 3. Accordingly, the auxiliary array 350 samples the third item 312 and the sixth item 314 from the linked list 300. The pointers stored in these items 312 and 314 are stored into the auxiliary array as access pointers 354 and 356. Note that these pointers 354 and 356 point to the fourth (Ken) and seventh (Sam) items on the linked list 300, respectively. It is noted that the size of an auxiliary array may exceed the number of actual items in the array to accommodate additional items in the future in accordance with a re-allocation scheme. Although the auxiliary array of the present embodiment is generated based on a regular sampling interval (m) of three, the present invention is equally suitable to other regular and irregular sampling intervals.

The auxiliary array 350 includes the first access pointer 352. Each dot in the auxiliary array 350 represents a pointer to an entry-point item in the linked list 300. The auxiliary array 350 also includes the pointer of every third item (i.e. m=3) in the linked list 300. For example, the access pointer 354 points to the item containing Ken as indicated by an arrow 316. Likewise, the access pointer 356 points to the item containing Sam in the linked list 300 as indicated by an arrow 318 in between. Although the present embodiment is illustrated by linked lists and arrays having one data field or element, those skilled in the art will no doubt appreciate that the embodiments of the present invention apply equally well to linked lists and arrays containing any number of data and pointer items. Moreover, the present invention is equally suitable for searching a linked list using auxiliary arrays containing both data and pointers in index items. In that case, the present invention provides for additional data fields in the auxiliary array and the data in the data fields used for comparison during a search process.

Typically, an item in a linked list has more than one data item. For example, an item may contain a name, an ID number, an address, and a phone number in addition to a pointer. Any one of these data items can be used as a key item for determining a sorted order in the linked list. That is, the items in the linked list may be arranged in a sorted order according to the name, ID number, and even address and phone numbers. However, irrespective of the number of data fields in an item, a sorted linked list can be arranged in a sorted order according to only one key data field at a time, as those in the art will no doubt recognize.

According to the present embodiment of the invention, an auxiliary array is searched, preferably using a binary search method, to find an access pointer to an entry-point item in the linked list. The entry-point item is either the desired item itself or an item that is close and precedes the desired item. According to a preferred binary search method, an item in a sorted array is found by repeatedly dividing the array into two halves by determining a midpoint in the array. The pointer corresponding to the midpoint in the array is then used to access the data item ("midpoint item") that the pointer is pointing to in the linked list. The data item thus accessed is compared to the desired item. Three results are possible: the midpoint item is larger than, smaller than, or equal to the desired item. If it is equal, the search ends. If riot, then one of the halves is selected and it is halved into two halves again. This process repeats until the desired pointer (i.e., an access pointer) containing a nearest pointer to the desired item is found in the auxiliary array. In addition to the preferred binary search method, it should be appreciated that a variety of binary search methods have been devised to this date. These binary search methods are well known in the art. Although a binary search method is used in the embodiments of the present invention, other search methods are equally suitable for implementation in the present invention.

Figure 6:
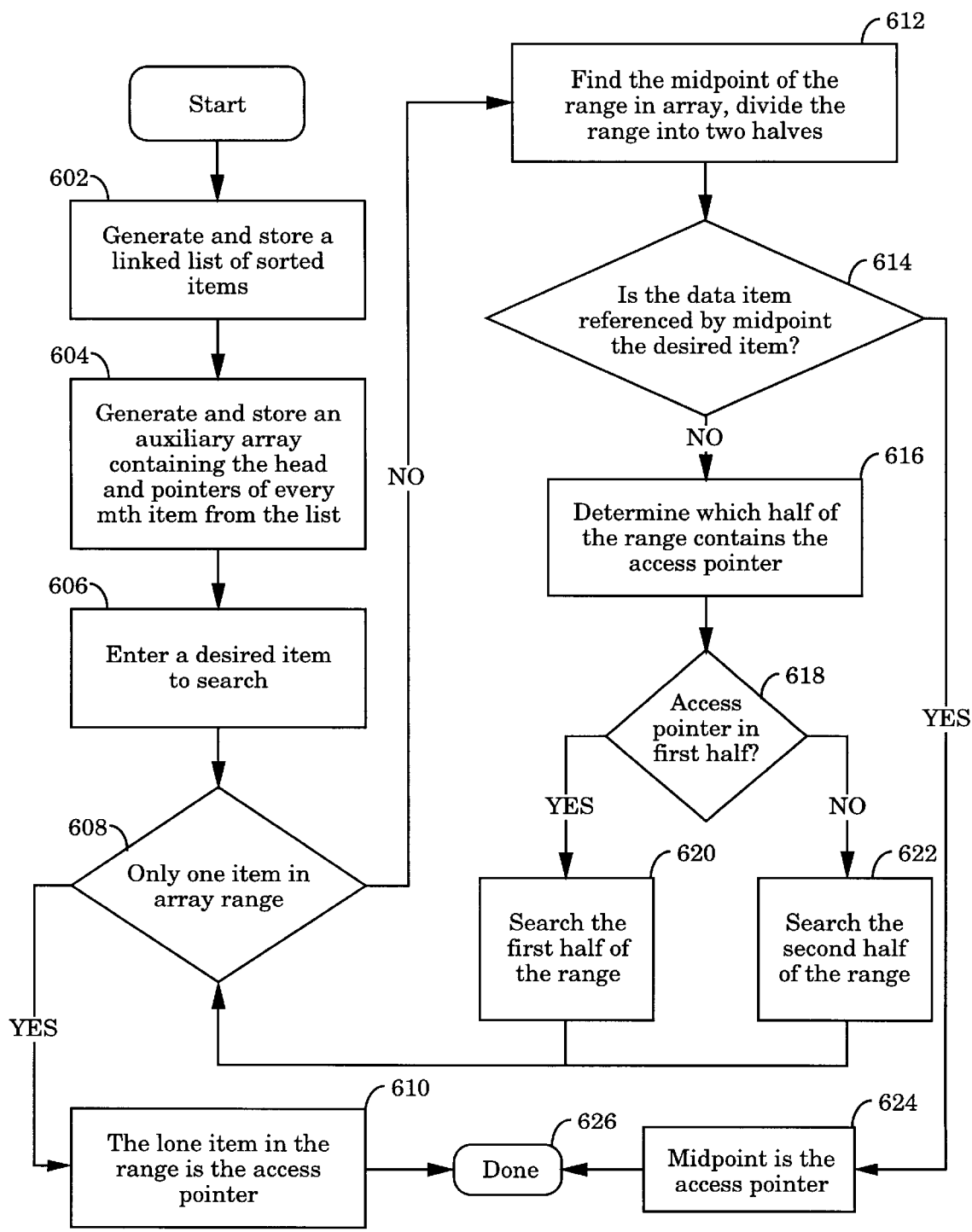
FIG. 6 illustrates a flowchart of steps involved in an exemplary binary search method according to an embodiment of the present invention.

FIG. 6 illustrates a flowchart of steps involved in an exemplary binary search method according to a present embodiment of the invention. In step 602, a sorted linked list is generated and stored in a computer storage unit, preferably a random access memory unit (RAM). Next in step 604, an auxiliary array containing the pointers of every mth item from the linked list is generated and stored into a computer storage unit, preferably a RAM. Initially, the range of the auxiliary array consists of the entire array. Then in step 606, a desired item to search is entered, either by a user or automatically by a program.

The present embodiment then performs a binary search on the auxiliary array. In step 608, the array range is tested to determine if it contains only one item. If so, then the lone item is the access pointer to an entry-point item in the linked list. The entry-point item is either the desired item itself or is an item close to and preceding the desired item. At this point, the search ends as shown in steps 610 and 624. If not, the initial search range is divided into two halves by determining a midpoint in the range in step 612. The midpoint is preferably calculated by dividing the range size (i.e., the number of items) of the array by 2. Then in step 614, the pointer in the midpoint of the range is used to access an entry-point item ("midpoint item") in the linked list. In addition, the midpoint item is tested to determine if it is the desired item. If so, the midpoint is the access pointer as in step 624 and the search comes to an end as in step 626. If not, in steps 616 and 618, a determination is made as to which half of the range the access pointer lies. Based on the determination, the search continues in either the first half of the range as in step 620 or the second half of the range as in step 622. The first half or the second half of the range is now used as a new array range. If the first half is chosen, then the midpoint is used as the ending point for the new array range. On the other hand, if the second half is chosen, the midpoint is used as the starting point for the new array range. The new array range is checked again to determine if it contains only one item as in step 608. This process repeats until an access pointer is found. The binary search process outlined in FIG. 6 represents a preferred search method among many variations of binary search techniques. It is to be appreciated that although such a binary search technique has been described with the preferred embodiment, various other search techniques are equally suitable to the present invention.

The binary search method is very efficient in searching a sorted array. To find an item in an array containing N sorted items, it requires only $\log_2 N$ steps of search. This is because at each search step, half of items in the list is eliminated. For example, a linked list has 10,000 items and its corresponding auxiliary array samples every 100th item in the list for a total of 100 index (i.e.. access pointer) items. In this case, a binary search on the auxiliary array takes seven steps at most to find an index item in the auxiliary array leading to a desired item or closest preceding item for which there is a pointer in the auxiliary array in the linked list. Moreover, the index item found through the binary search will be either the desired item or an item within 100 items of the desired item in the linked list. At the end of the search process, the desired item can be accessed by an additional 100 steps in the worst case scenario. Hence, access to an item in the exemplary linked list of 10,000 items takes seven searching steps and 100 linear searching steps for a total of 107 steps in the worst case. In contrast, the conventional sequential access method takes 10,000 steps to access an item in the worst case.

After an auxiliary array has been searched and an access pointer is found, that access pointer is used to access an entry item in the linked list. Then, the linked list is linearly traversed starting from the entry-point item until the desired item is found.

According to a preferred embodiment, the linear traversal requires at most m steps to access a desired item where the auxiliary array contains every mth item of a linked list. This is because an access pointer obtained through a search is always within m items of a desired item in the linked list. Hence, no more than m steps is required in accessing the desired item by sequentially traversing the linked list from the access pointer to the desired item.

Figure 7:
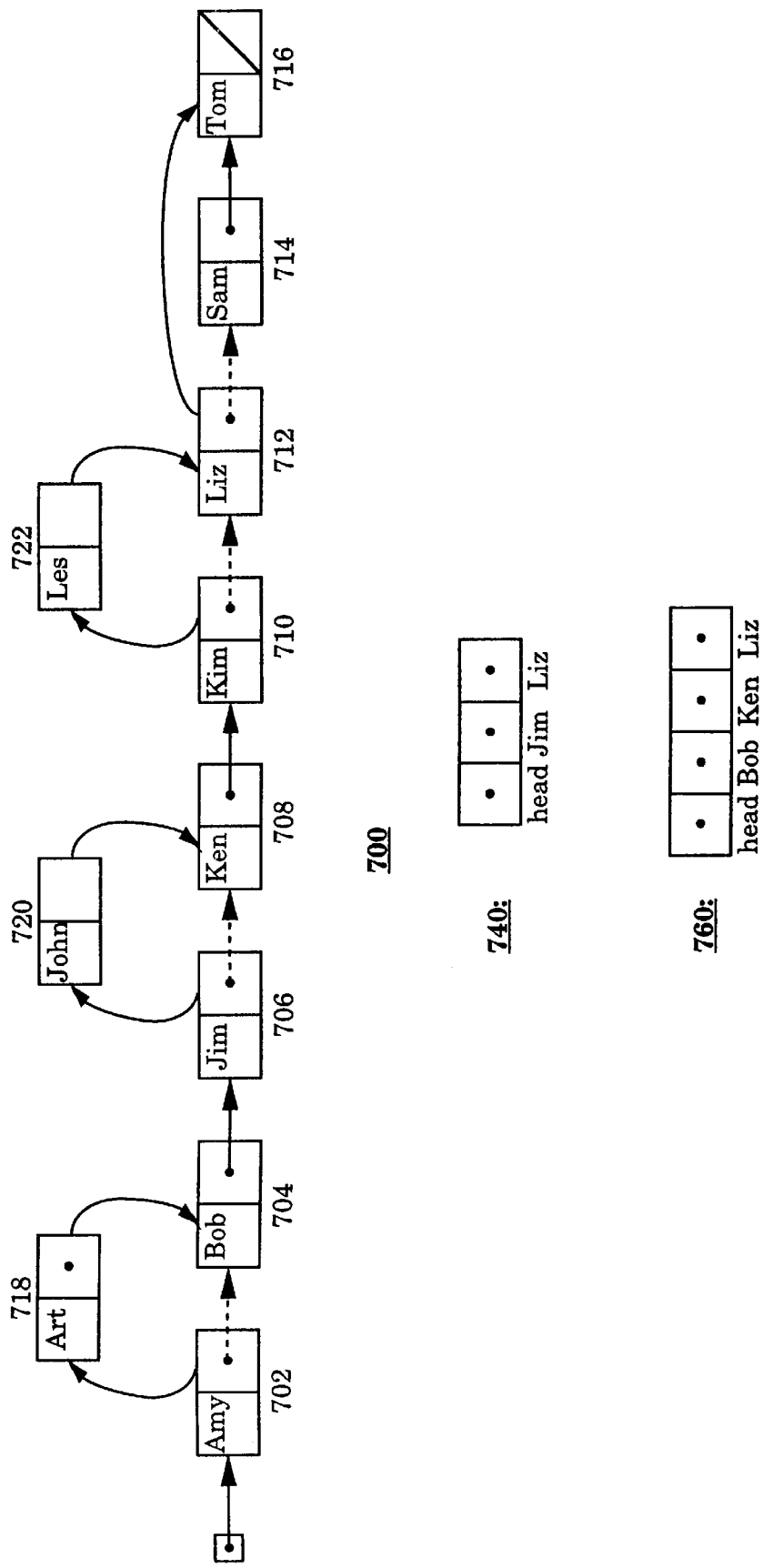
FIG. 7 illustrates updating of a sorted linked list through addition and deletion of items and a corresponding auxiliary array reflecting the changes in the list.

After an auxiliary array has been generated and stored, the linked list may change due to additions or deletions of items. Hence, an auxiliary array typically needs to be maintained and its size re-allocated to reflect additions and deletions to its corresponding linked list. FIG. 7 illustrates updating of a sorted linked list 700 with addition and deletion of items and a corresponding auxiliary array reflecting the changes in the list. Initially, the linked list 700 contains 8 items 702 through 716. The initial auxiliary array 740 corresponding to the initial list includes every third item from the list for a total of three items.

FIG. 7 illustrates an addition of three new items and a deletion of an item from the sorted linked list 700. For example, the new item 718, containing Art, is added to the list after the first item 702 containing Amy. For or an addition such as this, the item 718 to be added is assigned the same pointer as the previous item 702, which points to the next item 704 containing Bob. Then, the pointer in the previous item is set to point to the location of the item to be added. The previous link, as indicated by the dotted line between items 702 and 704, is thus displaced by the new pointer to item 718. Items 720 and 722 are both added in similar way.

A deletion of an item is illustrated in FIG. 7 by item 714 containing Sam. The pointer in the item previous to item 714 to be deleted is assigned the same pointer as the item to be deleted, which points to the next item 716 containing Tom. The previous link between items 712 and 714 is displaced as shown by the dotted line between them, which in effect deletes item 714.

The linked list 700 now contains 10 items. The initial auxiliary array is no longer up to date. Hence, the linked list 700 is traversed to generate an updated auxiliary array 760 reflecting the changes to the list. The updated auxiliary array has been reallocated to a size of 4 to accommodate four items of every third item in the list. In the present embodiment, an updated auxiliary array is generated in the same manner as generating a new auxiliary array for a new linked list.

According to an embodiment of the present invention, a new auxiliary array may be generated each time an insertion or removal occurs in the list. Alternatively, the updating of the auxiliary array may be postponed until a search is required. Then immediately before conducting the search, a new auxiliary array is generated reflecting the changes since creation of the last auxiliary array. For example, if items are added to or deleted from the list, an "array out-of-date" status flag is generated and stored to keep track of the fact that the array needs to be updated, i.e., regenerated. When a new search is required, a new auxiliary array is generated reflecting all changes accumulated since the last auxiliary array was built. In addition, when an auxiliary array is regenerated, it may require an array allocation to optimize memory space requirements to accommodate a smaller or larger array size.

The present invention, a method and system for accessing an item in a linked list within a computer system, utilizes an auxiliary array to store access pointer (i.e., index) items from the list. While the present invention has been described in particular embodiments, it should be appreciated that the present invention should not be construed as being limited by such embodiments, but rather construed according to the claims below.

What is claimed is:

1. In a computer system wherein a plurality of items are stored in a sorted linked list, a method for accessing one of the plurality of items, comprising the steps of:

generating an auxiliary array based on the linked list, said auxiliary array containing a subset of the items in the linked list and pointers to the subset of the items in the linked list, said auxiliary array not requiring the same number of entries as the link list;

receiving a request to access a particular item in the linked list;

searching said auxiliary array for an access pointer, said access pointer being a pointer to an entry-point item on the linked list which either is the particular item or is an item that precedes the particular item;

accessing said entry-point item using said access pointer; and traversing said linked list starting from said entry-point item until said particular item is accessed.

2. A method as recited in claim 1, wherein said auxiliary array is comprised of the every mth item from said linked list.

3. A method as recited in claim 2, wherein the access pointer corresponding to the particular item is located within m items of the particular item in the linked list.

4. A method as recited in claim 3, wherein said access pointer corresponding to the particular item is located within m items prior to the particular item in the linked list.

5. A method as recited in claim 2, wherein said auxiliary array generating step further comprises the steps of:

specifying a size of said auxiliary array;

traversing said linked list starting from a starting pointer of said linked list;

storing the starting pointer of said linked list into the first item of said array; and storing the every mth item from said linked list onto said array.

6. A method as recited in claim 5, wherein the m is specified by a user.

7. A method as recited in claim 5, wherein the auxiliary array size is programmable based on m and the size of said auxiliary array.

8. A method as recited in claim 1, wherein the searching is conducted according to a binary search method.

9. A method as recited in claim 1, wherein the linked list is traversed from the pointer in the access pointer corresponding to the particular item.

10. A method as recited in claim 9, wherein the linked list is traversed through the pointers at each item in said linked list.

11. A method as recited in claim 1 further comprising the step of updating the linked list before generating the auxiliary array.

12. A method as recited in claim 11, wherein the updating further comprises adding at least one new item.

13. A method as recited in claim 11, wherein the updating further comprises deleting at least one item.

14. A method as recited in claim 11 further comprising the step of generating and storing an array-out-of-status flag in a computer storage unit to keep track of any updating of the linked list.

15. A method as recited in claim 14, wherein the auxiliary array is generated only when the array-out-of-status flag indicates that the linked list has been updated.

16. A computer system, comprising:

a bus;

a processor coupled to the bus;

a display device coupled to the bus; and a computer readable memory unit coupled to the bus and having a data structure comprised of:

a linked list comprised of a plurality of items, each item having a data item and a pointer wherein the items in the linked list are arranged in a sorted order; and an auxiliary array derived from the linked list, the auxiliary array containing a subset of the items of the linked list and a plurality of access pointers to a selected subset of the items of the linked list, wherein the auxiliary array is searched to find a particular access pointer to traverse the linked list to access a particular item, said access pointers being pointers to entry-point items on the linked list which either is the particular item or is an item that precedes the particular item and said auxiliary array not requiring the same number of entries as the link list.

17. A system as recited in claim 16 wherein the auxiliary array is comprised of the every mth item from said linked list.

18. A system as recited in claim 17, wherein the access pointer is located within m items of the particular item in the linked list.

19. A system as recited in claim 18, wherein the access pointer is located within m items prior to the particular item in the linked list.

20. A system as recited in claim 17, wherein the auxiliary array is derived according to the steps of:

specifying a size of said auxiliary array;

traversing the linked list from a starting pointer to the linked list;

storing the starting pointer to said linked list as an access pointer into said auxiliary array; and storing the every mth item from said linked list onto said array.

21. A system as recited in claim 20, wherein the auxiliary array size is programmable based on m and the size of said auxiliary array.

22. A system as recited in claim 16, wherein the auxiliary array is searched according to a binary search method.

23. A system as recited in claim 16, wherein the linked list is traversed from the access pointer in the auxiliary array.

24. A system as recited in claim 16, wherein the linked list is traversed through the pointers in each item of the linked list.

25. A system as recited in claim 20, wherein the m is specified by a user.

26. A system as recited in claim 16, wherein the linked list is updated before generating the auxiliary array.

27. A system as recited in claim 26, wherein the updating further comprises adding at least one new item.

28. A system as recited in claim 26, wherein the updating includes deleting at least one item.

29. A system as recited in claim 26, wherein the system further includes an array-out-of-status flag generated and stored in a computer storage unit to keep track of any updating of the linked list.

30. A system as recited in claim 29, wherein the auxiliary array is generated only when the array-out-of-status flag indicates that the linked list has been updated.

* * * * *